W. L. MERRILL.
PUMPING SYSTEM.
APPLICATION FILED APR. 17, 1909.
1,049,894.
Patented Jan. 7, 1913.
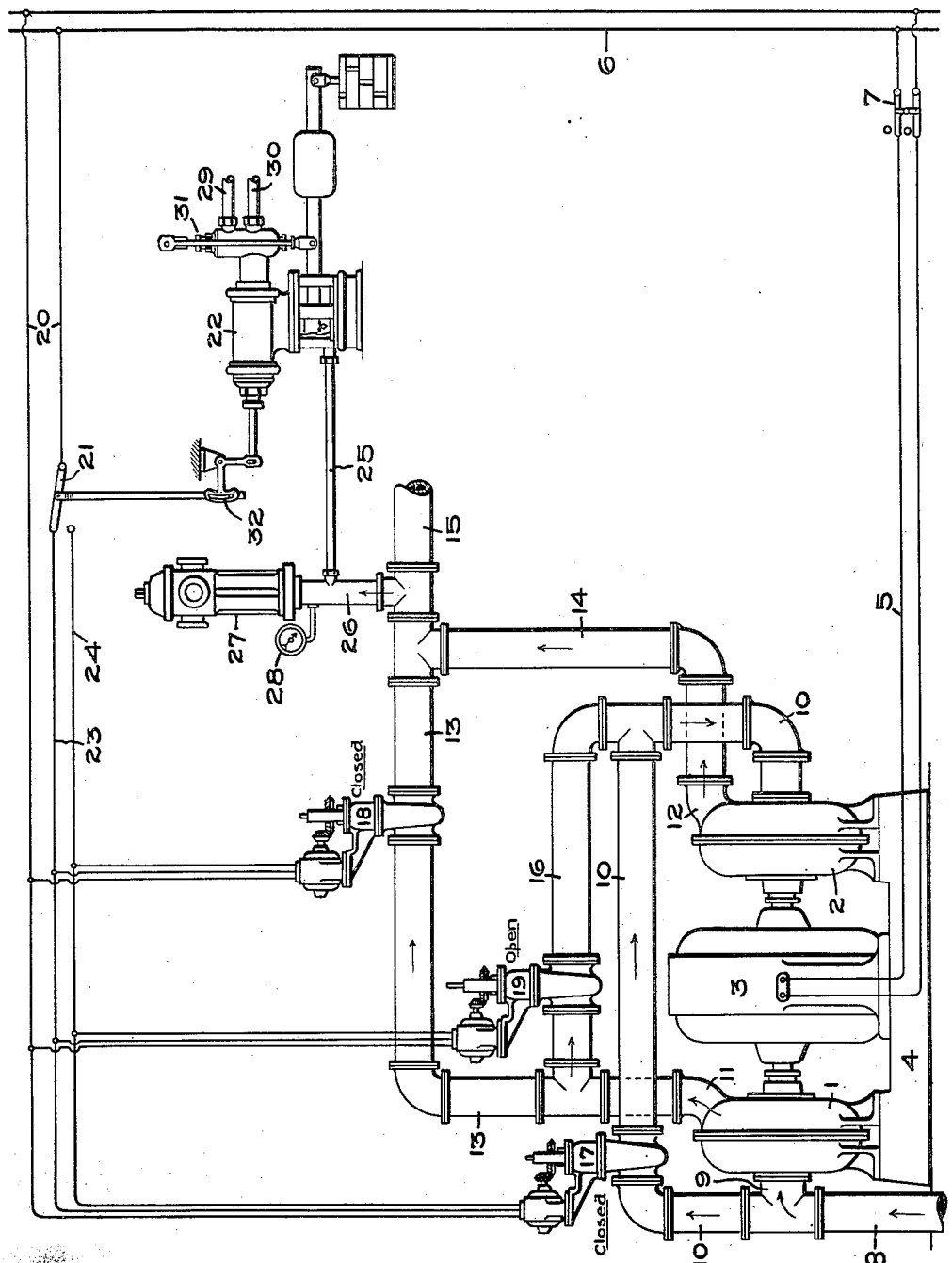
Witnesses:
Inventor:
Wilbur L. Merrill,
by ................ Att'y.

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

PUMPING SYSTEM.

1,049,894.     Specification of Letters Patent.     Patented Jan. 7, 1913.

Application filed April 17, 1909. Serial No. 490,609.

*To all whom it may concern:*

Be it known that I, WILBUR L. MERRILL, a citizen of the United States, residing at Schenectady, county of Schenectady, State of New York, have invented certain new and useful Improvements in Pumping Systems, of which the following is a specification.

The invention relates to pumping systems and the object of the invention is to provide a system in which a plurality of pumps driven by suitable means are normally connected in parallel to deliver a liquid such as water to a system of distributing conduits and maintain a certain service pressure therein, but are automatically thrown into series relation to maintain the pressure at a relatively high value when the pressure in the distributing portion of the system tends to drop due to a relatively large and perhaps sudden demand upon it, such as might be caused by the opening of a hydrant or several hydrants in case of fire.

The accompanying drawing illustrates in a somewhat diagrammatic manner one of the embodiments of the invention in which two rotary pumps, 1 and 2, are driven by suitable means such as an electric motor 3 arranged in axial alinement with the pump shafts, the members of the pumping set or unit being mounted in a compact and efficient group on a base 4. The invention is not limited, however, to the particular number and forms of pumps and motors shown. Obviously it may be applied to a system having a number of pumps greater than two. Current for operating the driving motor is supplied by conductors 5 leading from the mains 6. A suitable switch 7 is provided for stopping and starting the motor when desired.

Water is received by the pumps from any suitable source of supply through a conduit 8. A branch conduit 9 leads from conduit 8 to a suction inlet at the center of pump 1. Another branch 10 leads to a suction inlet at the center of pump 2. The discharge outlets 11 and 12 of the pumps 1 and 2 are connected by conduits 13 and 14 with the conduit 15 forming a part of any suitable distributing system which is supplied by the pumps. A conduit 16 connects the discharge conduit 13 with the branch supply conduit 10 leading to the suction inlet of pump 2. Thus the conduit 16 may under certain conditions serve as the suction or supply conduit of the pump 2. Motor-operated stop valves 17, 18 and 19 are located in and control the flow through the conduits 10, 13 and 16, respectively. The motors are preferably reversible, that is they are capable of being run in either direction under proper control. Current for operating the valve motors is supplied from the mains 6 by the conductors 20. One of the conductors 20 leads to a switch 21 which is controlled by a pressure actuated regulator 22. The switch may connect said conductor 20 to either of the conductors 23, 24 leading to the motors. This regulator is connected by a pipe 25 to the distributing portion of the system, for example, to the branch conduit 26 leading to a hydrant 27. A pressure gåge 28 may also be connected to the conduit 26 to indicate the pressure in said portion of the system.

Suitable motive fluid is supplied to and exhausted from the regulator when required by the pipes 29 and 30 under the control of a valve 31 that is held closed against the admission of motive fluid so long as pressure communicated to the regulator through the pipe 25 is normal. When this pressure falls off due to opening the fire hydrant 27 or to some similar cause, the regulator moves the switch 21 to the position shown in the drawing and the valve motors are actuated to close the valves 17 and 18 and to open the valve 19, thus causing the water to flow through the pumps 1 and 2 in series and from the second pump to the distributing system. By passing the water through the pumps in series its pressure is raised and this increased pressure tends to counteract the fall in pressure due to the opening of the hydrant and to maintain the desired service pressure in the distributing system. When the hydrant is closed again the switch 21 may be thrown to its other position by hand ready for operation by the regulator when occasion demands. While it is very important and urgent that the pumps should be promptly brought into series relation when a sudden demand is made upon the distributing system, after that demand ceases there is ample time and opportunity for resetting the switch and the regulator by hand if desired, but the regulator is preferably reset by the pressure on the system when it returns to its normal value. The slotted connection at 32 permits this resetting of the regulator without disturbing the position of the switch 21. Moving the switch to its other position in contact with the conductor 24 operates the valve motors in the opposite direction, thereby opening the valves 17 and 18 and closing the valve 19. When the valves are in the position last described, water supplied by conduit 8 flows through the pumps in parallel and is delivered to the distributing system at a pressure suitable for normal operation. Thus it will be seen that the pumping system responds promptly and automatically to the demands upon it and is readily restored to normal condition when the demand ceases.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a pumping system, the combination of a plurality of pumps, a motor for driving the pumps, suction and discharge conduits for the pumps which normally connect them in parallel to supply the distributing portion of the system, conduit means connecting the discharge conduit of one pump with the suction conduit of another pump, valves for controlling the flow through said suction, discharge and connecting conduits, electric motors for opening and closing the valves, a source of electrical energy, mechanism for controlling the supply of energy from said source to the motors comprising a switch device, and means responsive to the pressure in the distributing portion of the system which actuates the switch device to cause the motors to open certain of said valves and close others, to thereby change the pumps from parallel to series operation when the pressure in the distributing portion of the system falls below the normal service pressure.

2. In a pumping system, the combination of a plurality of pumps, means for driving the pumps, suction and discharge conduits for the pumps which normally connect them in parallel to supply the distributing portion of the system, means for changing the pumps from parallel to series relation comprising conduits connecting the discharge conduit of each of the pumps in the series except the last one to the suction conduit of the next pump in the series, valves controlling the flow through said connecting conduits, valves controlling the flow through the discharge conduit of each of the pumps except the last one of the series, said valves being located beyond the points where said connecting conduits join the discharge conduits, valves controlling the flow through the suction conduits of each pump except the first one of the series, motors for operating each of said valves in the discharge, suction and connecting conduits, and a single device responsive to the pressure in the distributing portion of the system that controls the supply of energy to the motors and causes them to close said suction and discharge conduit valves and to open the connecting conduit valves when the pressure in said portion falls below the normal service pressure.

3. In a pumping system, the combination of a plurality of pumps, a motor for driving the pumps, suction and discharge conduits for the pumps which normally connect them in parallel to supply the distributing portion of the system, conduit means connecting the discharge conduit of one pump with the suction conduit of another pump, valves for controlling the flow through said suction, discharge and connecting conduits, electric motors for opening and closing the valves, a source of electrical energy, mechanism for controlling the supply of energy from said source to the motors comprising a switch, a regulator responsive to the pressure in the distributing portion of the system which actuates the switch to cause the motors to open certain of said valves and close others, to thereby change the pumps from parallel to series operation when the pressure in the distributing portion of the system falls below the normal service pressure, and means connecting the regulator and the switch which includes a lost motion device to permit the regulator to be reset without disturbing the position of the switch.

In witness whereof, I have hereunto set my hand this 15th day of April, 1909.

WILBUR L. MERRILL.

Witnesses:
BENJAMIN B. HULL,
HELEN ORFORD.